United States Patent [19]

Jones

[11] 3,999,643
[45] Dec. 28, 1976

[54] ELECTRICAL INTERLOCK SAFETY CONTROL TO PREVENT OPERATION OF MOWER DURING REVERSE TRAVEL

[75] Inventor: Kenneth R. Jones, Thiensville, Wis.

[73] Assignee: Allis-Chalmers Corporation, Milwaukee, Wis.

[22] Filed: Dec. 22, 1975

[21] Appl. No.: 643,315

[52] U.S. Cl. .............................. 192/.052; 192/3.56; 192/18 B; 192/.02 R; 56/11.8; 180/101; 192/.072; 192/.09

[51] Int. Cl.² .................. B60K 21/00; A01D 69/08

[58] Field of Search ............... 192/3.56, .044, .052, 192/.092; 74/850; 56/11.2, 11.7, 11.8

[56] References Cited
UNITED STATES PATENTS

| 1,978,523 | 10/1934 | Davis | 192/3.56 X |
| 3,605,962 | 9/1971 | Maynard | 192/3.56 X |
| 3,773,156 | 11/1973 | Nyguist | 74/850 X |
| 3,827,540 | 8/1974 | Bolinger et al. | 74/850 X |

Primary Examiner—Benjamin W. Wyche
Attorney, Agent, or Firm—Charles L. Schwab

[57] ABSTRACT

A transmission lever operated switch is incorporated in the electric control circuit for an electric clutch employed in the drive of a tractor mounted mower whereby the electric circuit is deenergized whenever the transmission control lever is placed in its reverse position. The control circuit for the electric clutch includes a seat operated switch whereby the electric circuit will be deenergized whenever the seat is unoccupied. The electric circuit further includes an on-off switch which is interconnected with an ignition circuit switch for an internal combustion engine whereby when the ignition switch is closed, the on-off switch for the electric clutch circuit will be open. Thus, during starting of the engine, the mower blade drive will be inoperative due to the deenergization of the electric clutch control circuit. The electrical interlock control prevents operation of the mower blade during starting of the engine, when the operator's seat is unoccupied and/or when the transmission control is in reverse.

4 Claims, 2 Drawing Figures

ELECTRICAL INTERLOCK SAFETY CONTROL TO PREVENT OPERATION OF MOWER DURING REVERSE TRAVEL

BACKGROUND OF THE INVENTION

Heretofore, others have provided various safety systems in riding mowers. U.S. Pat. No. 3,626,676 discloses an electrical system which prevents a recoil rope start engine of a riding mower from starting unless the mower is disengaged and the vehicle drive is disengaged. The safe-start electrical system grounds the engine ignition system if an attempt is made to start the engine while either the vehicle clutch or the mower clutch is engaged. A somewhat similar system is provided in U.S. Pat. No. 3,608,285 for a mower having an engine which is provided with an electric starter. U.S. Pat. No. 3,229,452 discloses a riding type mower with an interlock system which automatically shuts off the motor when the operator leaves his seat, if either the cutter mechanism or the vehicle drive mechanism or both are drivingly engaged with the motor. This last mentioned patent also provides means for preventing starting of the motor when the operator is dismounted unless the vehicle drive and the cutter drives are disengaged. U.S. Pat. No. 3,229,452 also provides means for automatically braking the cutter upon discontinuance of drive thereto. U.S. Pat. No. 3,782,084 provides an interlock between the ignition system of the engine of the riding mower which prevents starting of the engine when either the transmission is drivingly connected to the traction wheels or the clutch connecting the engine with the mower is engaged.

BRIEF DESCRIPTION OF THE INVENTION

When a transmission lever is moved to a reverse position, a switch is moved to an open position to deenergize an electric clutch through which the engine drives the mower blade of a tractor mounted mower. Thus, the mower blade cannot be operated when the vehicle is traveling in reverse; and if the mower clutch is energized at the time the operator attempts to operate the tractor in reverse, the mower drive will be interrupted during reverse travel and will automatically reengage when the operator moves the control from reverse travel to neutral or forward travel. The mower drive is interrupted upon the operator's station being vacated. And also when the operator moves a manual switch to energize the starting circuit. This latter function is achieved by the interconnection between a pair of on-off switches whereby the electric clutch cannot be energized when the starting circuit is energized.

BRIEF DESCRIPTION OF THE DRAWINGS

The best mode known to the inventor for carrying out the present invention is illustrated in the attached drawings wherein.

DETAILED DESCRIPTION OF THE INVENTION

Figure 1:
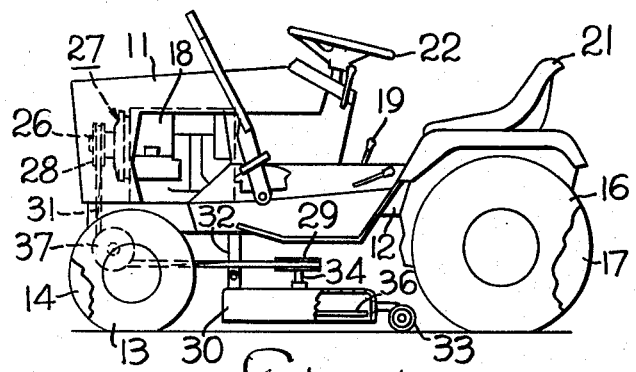
FIG. 1 is a side view of lawn and garden tractor with underslung rotary mower.

Referring to FIG. 1, the lawn and garden tractor 11 includes a main frame 12 which is supported at its front end by a pair of steerable wheels 13, 14 and at its rear end by a pair of drive wheels 16, 17. A power unit in the form of an internal combustion engine 18 is mounted on the front end of the frame 12 and is connected by a suitable drive train to the drive wheels 16, 17, including a transmission with a manual control in the form of a lever 19. An operator's station in the form of an operator's seat 21 is provided on the rear of the tractor at a location convenient to manually operate controls including a steering wheel 22. An engine drive shaft 26 extends forwardly from the engine 18 and an electric clutch and brake unit 27 is associated therewith to selectively drive or brake a belt pulley 28 which is drivingly connected to a mower pulley 29 on a mower attachment 30 by way of a drive belt 31. The mower attachment is pivotally connected at its foward end to a link 32 and is supported at its rear end by ground engaging wheels 33. A shaft 34 to which a mower pulley 29 is nonrotatably secured carries a rotary mower blade 36 on is lower end. It will be noted that the drive belt 31 passes over a pair of idlers 37, only one of which is shown, which change the belt direction 90°.

Figure 2:
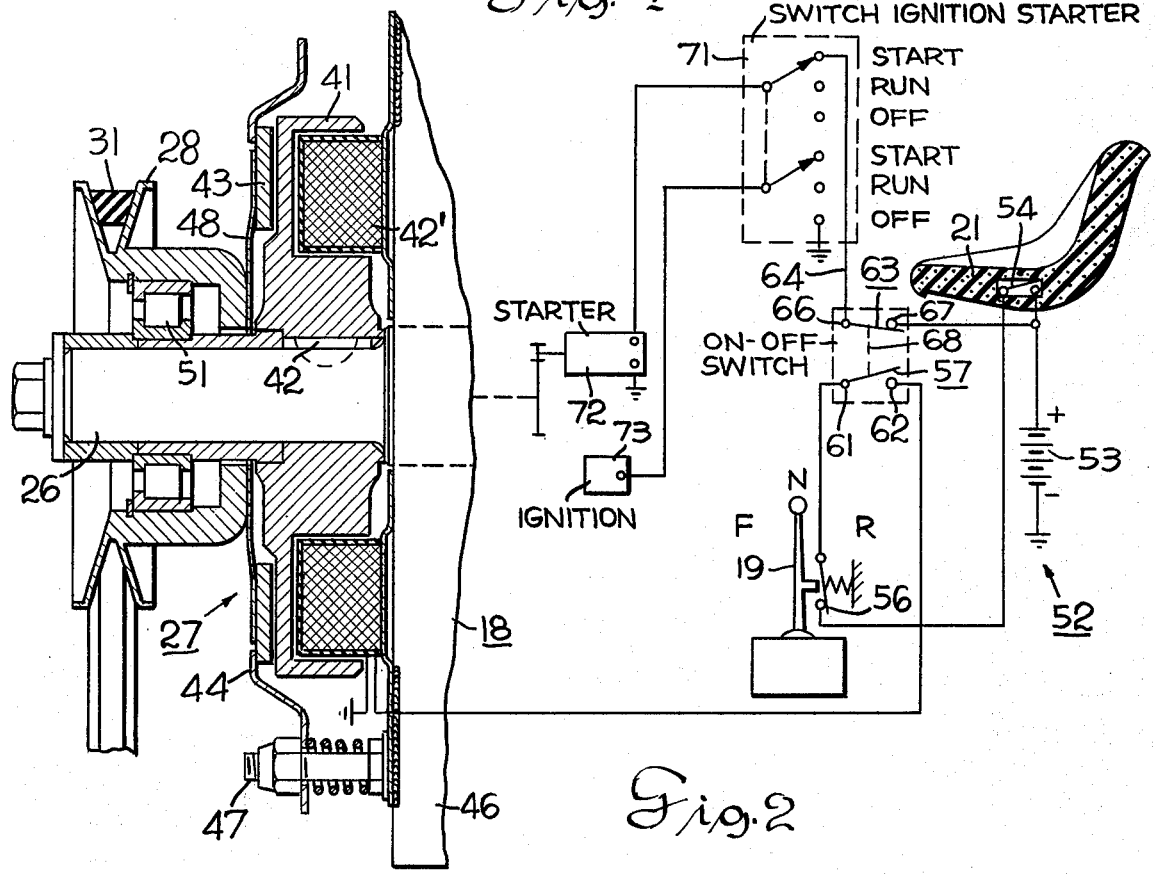
FIG. 2 is a schematic showing of the electric control for the tractor shown in FIG. 1 and incorporating the present invention.

Referring to FIG. 2, the output shaft 26 of the engine 18 has a rotor 41 nonrotatably secured thereto by a key 42. The rotor 41 is selectively energized by a stationary field winding or coil 41 secured to the engine. Upon energization of the coil 41, flux will be induced into the rotor 41 which will cause an armature 43 to be drawn into engagement therewith; that is, it will be caused to move to the right as viewed in FIG. 2. This movement will disengage the armature from a braking disc 44 secured to the engine housing 46 by studs 47. The armature 43 is nonrotatably secured to the pulley 28 by a belleville spring 48 and the pulley 28 is rotatably carried on the drive shaft 26 of the engine 18 by a suitable bearing 51. As illustrated, the clutch and brake unit 27 is in a braking mode of operation wherein the pulley 28 is braked by the action of the frictional engagement between the armature 43 and the braking disc 44. An electric circuit 52 is provided for energizing the coil 41 of the clutch and brake unit 27, which includes a battery 53, a seat switch 54, a transmission lever operated switch 56, and a manually operated on-off switch 57.

When it is desired to energize the clutch circuit 52, it is necessary for the operator to move the contactor element of switch 57 downwardly from its illustrated open position to a closed position wherein the contacts 61, 62 are bridged. When this occurs, the contactor of switch 63 in the engine starting circuit 64 will be moved from its illustrated closed position to an open position to break the circuit between the contacts 66, 67. This occurs due to mechanical interconnecting means 68 between the switches 57 and 63. The clutch circuit 52 is deenergized whenever the operator's seat 21 is unoccupied because the seat switch 54 will be open. As illustrated, the manually operated on-off switch 57 for the clutch is open and the switch 63 of the starter circuit 64 is closed, thus permitting starting of the engine upon moving the key operated switch 71 to its illustrated start position to operate the starter 72. After the engine is started, a generator, not shown, provides the necessary current for the ignition 73 of the engine 18. Accordingly, the clutch switch 57 can now be moved to its closed position without stopping the engine.

OPERATION OF THE INVENTION

The operator cannot start the engine 18 unless the mower clutch switch 57 is in its open position. This is insured by the mechanical interconnection between the engine starting circuit switch 63 and the clutch switch 57. After the engine is started, the operator may move the switch 57 from its illustrated open position to its closed position in which the contacts 61, 62 are bridged thereby opening switch 63, which interrupts the starting circuit 64. This action will not stop the engine because the engine ignition system is being supplied current by way of an engine generator (not shown). If the transmission lever 19 is in either the illustrated neutral position or is in its forward position, and the operator is seated in the seat 21, the clutch circuit 52 will be energized upon closing switch 57 and the pulley 28 will be connected to the engine output shaft 26 by the frictional engagement of the armature 43 with the rotating rotor 41. Thus, the drive belt 31 will be driven to rotate the mower blade 36. If while mowing the operator shifts to a reverse drive, the transmission control operated switch 56 in the electric clutch operating circuit 52 will be opened, thereby deenergizing the electric clutch and disengaging the mower drive. When the clutch is deenergized, the belleville spring 48 interconnecting the armature 43 with the pulley 28 will move to its illustrated braking position, thereby braking the blade 36 to a stopped condition. It should be noted that if the operator leaves his seat, the mower drive will be disconnected and the mower blade braked. Further, it will be noted that if the engine should die while the operator is mowing, the engine cannot be restarted with the mower in a drive condition because it will be necessary for the operator to move the switch 63 to a closed position and, in so doing, switch 57 will be opened. If the operator decides to reverse the direction of travel while he is mowing, he can shift to a reverse position and, in so doing, the drive to the mower blade will be disconnected by opening switch 56 and deenergization of the clutch 27. When the operator shifts again to forward or neutral, the mower drive will be automatically reengaged by the closing of switch 56 and the energization of the clutch 27.

The embodiments of the invention in which an exclusive property or privilege is claimed are defined as follows:

1. In a tractor and mower combination including an electric clutch in the drive train between the tractor power unit and the mower, an operator's station and a transmission control having forward and reverse positions corresponding to forward and reverse directions of travel of the tractor, a control system comprising:
   an electric control circuit for said electric clutch including
      a source of electric power, and
      circuit means interconnecting said source and said electric clutch including a transmission operated switch operatively associated with said transmission control and having opened and closed positions, said switch being in its closed position when said transmission control is in its forward position and said switch being in its opened position when said transmission control is in its reverse position.

2. The control system of claim 1 wherein said control circuit includes a second switch operatively associated with said operator's station movable from a normally opened position to a closed position when said operator's station is occupied.

3. The control system of claim 2 wherein said power unit is an internal combustion engine and said control circuit includes a manually operated on-off switch and further comprising an engine starting circuit, including a disconnect switch having open and closed positions and means interconnecting said on-off switch with said disconnect switch whereby said on-off switch is in its off position when said disconnect switch is in its closed position.

4. The control system of claim 1 wherein said power unit is an internal combustion engine and said control circuit includes a manually operated on-off switch and further comprising an engine starting circuit, including a disconnect switch having open and closed positions and means interconnecting said on-off switch with said disconnect switch whereby said on-off switch is in its off position when said disconnect switch is in its closed position.

* * * * *